July 7, 1959  W. J. MORRILL  2,894,157
WINDING FORMS FOR DYNAMOELECTRIC MACHINES
Filed July 20, 1956
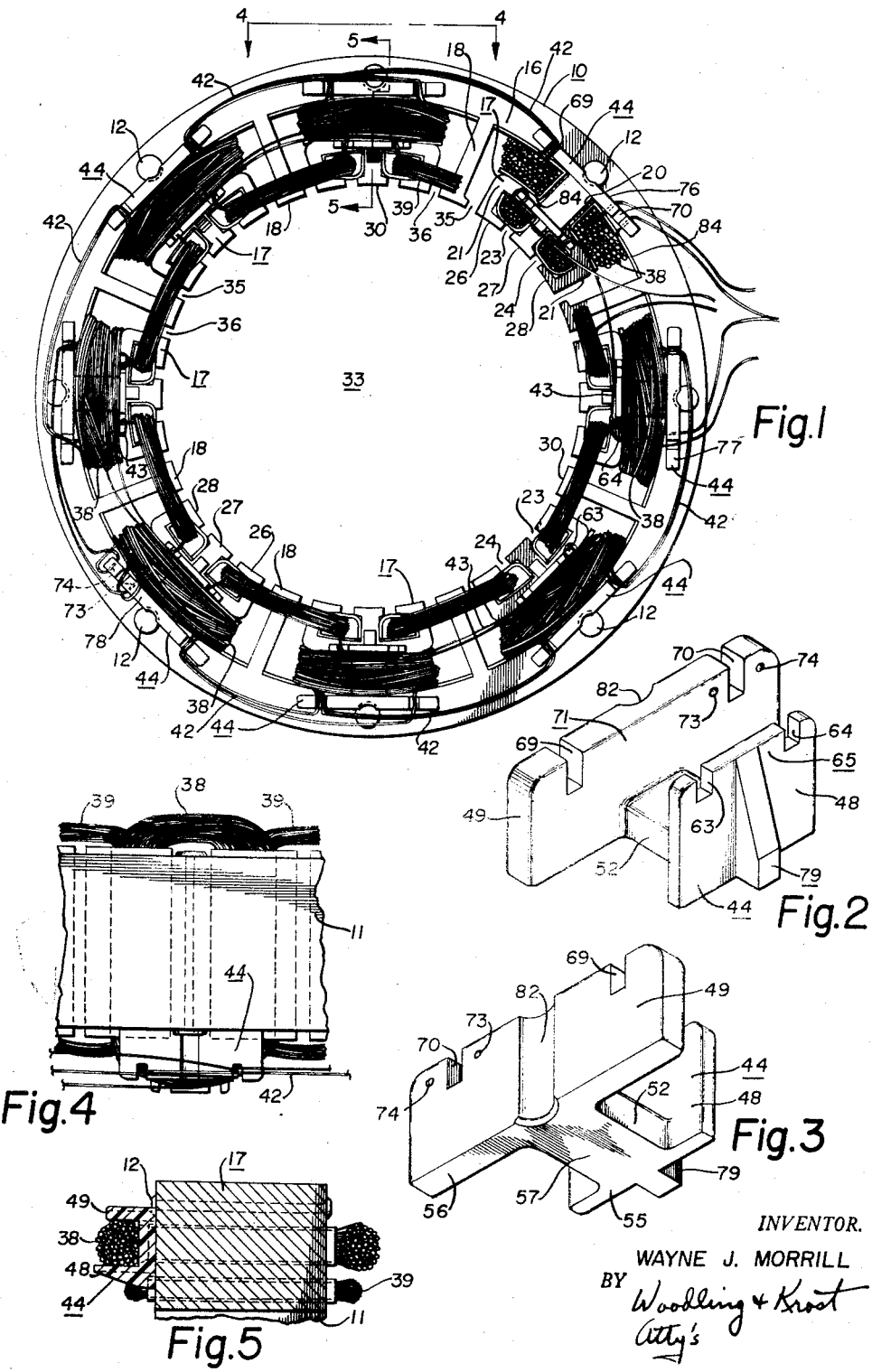
INVENTOR.
WAYNE J. MORRILL
BY Woodling & Kroot
Atty's

United States Patent Office 2,894,157
Patented July 7, 1959

2,894,157
WINDING FORMS FOR DYNAMOELECTRIC MACHINES

Wayne J. Morrill, Garrett, Ind.

Application July 20, 1956, Serial No. 599,132

6 Claims. (Cl. 310—179)

The invention relates in general to members for dynamoelectric machines and more particularly to winding forms for confining the windings of such machines.

An object of the invention is to provide a winding form to contain the windings of a dynamoelectric machine whereby the necessity of lacing the windings after they are wound is obviated.

Another object of the invention is to provide a winding form having notches on an outer wall member into which the wires which lead from either side of a main winding to other main windings may be placed, to firmly support these wires to prevent physical misuse and possible grounding.

Another object of the invention is to provide a winding form having notches on an inner wall member into which the wires which lead from either side of a starting winding to other starting windings may be placed to firmly support these wires to prevent physical misuse and possible grounding.

Another object of the invention is to provide a winding form having holes into which the ends of a winding may be anchored to prevent slack in the windings of a dynamoelectric machine.

Another object of the invention is to provide a winding form having outer and inner side members and an interconnecting member connecting the side members which rests on a tooth around which a winding extends whereby the form will be secured to the tooth by the winding and the winding will be confined between the side members.

Another object of the invention is to provide a winding form which is secured to the stator which it cooperates with by a winding which the form is adapted to contain.

Another object of the invention is to provide a winding form having notches thereon into which the wires from the windings of a dynamoelectric machine may be placed.

Other objects and a fuller understanding of this invention may be had by referring to the following description and claims, taken in conjunction with the accompanying drawin, in which:

Figure 1 is a plan view showing the stator of a dynamoelectric machine with the winding forms of the present invention in place thereon;

Figure 2 is an isometric view of a winding form of the present invention;

Figure 3 is an isometric view of the winding form of Figure 2 taken from a different angle;

Figure 4 is a view taken along the line 4—4 of Figure 1; and

Figure 5 is a view taken along the line 5—5 of Figure 1.

Referring to Figure 1, a stator 10 of a dynamoelectric machine has been shown which is formed from a stack of laminations 11 which are held together by a plurality of circumferentially spaced and axially extending bolts 12. The stator 10 includes a circumferentially extending yoke 16 from which first and second primary radial teeth 17 and 18, respectively, extend. The first primary teeth 17 include a narrow portion 20 connected to the yoke 16 and extending generally normal thereto and a wide portion 21. The wide portion 21 is connected to the narrow portion 20 and extends generally parallel to the yoke 16. The wide portion 21 has starting winding slots 23 and 24 therein which form a plurality of short teeth 26, 27, and 28. The teeth of the stator 10 are provided with a flared end portion 30 which flared end portion tends to form an axially extending bore 33 in which a rotor (not shown) is adapted to rotate in a completed dynamoelectric machine. The stator construction is similar to that shown in applicant's Patent No. 2,485,628, issued October 25, 1949.

The second primary teeth 18 are arranged alternately with the first primary teeth 17 to form main winding slots 35 and 36 therebetween. Main windings 38 are wound around each of the narrow portions 20 of the first primary teeth 17 and starting windings 39 each extend through a starting winding slot 23 and around a short tooth 26 of one of the first primary teeth 17 and through a starting winding slot 24 and around a short tooth 28 of an adjacent first primary tooth 17. As a result each of the starting windings 39 extend generally around a second primary tooth 18 which lies between two first primary teeth 17. As will be noted from a view of Figure 1, eight main windings 38 have been shown and a similar number of starting windings 39. One of the main windings 38 has been shown in section whereas a portion of two starting windings has been shown in section. First lengths of wire 42 extend between and unite each of the main windings 38 and second lengths of wire 43 extend between and unite each of the starting windings 39.

Figures 2 and 3 best show the winding forms 44 of the present invention. Each of the winding forms 44 which have been shown in place in Figure 1 comprise a unitary plastic structure which includes an inner and outer wall member 48 and 49, respectively. An interconnecting member 52 extends between the inner and outer wall members 48 and 49, respectively, and fixedly secures them in place. The inner and outer wall members have bottom surfaces 55 and 56, respectively, and the interconnecting member 52 has a bottom surface 57, and all of these surfaces lie substantially in a single plane. This forms a continuous uninterrupted flat surface on the winding form. The outer wall member 49 is longer than the inner wall member 48 and the inner wall member is higher than the outer wall member.

When the winding forms of the present invention (Figures 2 and 3) are in place on the stator 10 (Figure 1) of a dynamoelectric machine, the bottom surface 56 of the outer wall member resides on the yoke 16, the bottom surface 57 of the interconnecting member resides on the narrow portion 20 of the first primary teeth 17 and the bottom surface 55 of the inner wall member resides on the wide portion 21 of the first primary teeth 17. The flat engaging surface of the winding form 44 and the flat surface of the stator which it engages insures that the winding form will be well balanced in its position thereon. The main windings 38 extend over the interconnecting member 52 in a wound stator and between the inner and outer wall members 48 and 49, respectively. This is best seen in Figure 5.

The inner wall member 48 has first and second notches 63 and 64 at an upper portion 65 thereof and each of these notches is located at opposite end portions of the inner wall member 48. The outer wall member 49 is provided with first and second notches 69 and 70, respectively, at an upper portion 71 thereof and at opposite end portions thereof. The outer wall member 49 is provided with first and second holes 73 and 74, respectively, which extend therethrough and which are located on either side of the notch 70. These holes may be referred to as anchoring or securing apertures. The first lengths of wire 42 on opposite sides of a main winding 38 extend in the first and second notches 69 and 70, respectively, of the outer wall member 49 and on to other main windings 38 which are located adjacent thereto. As seen in Figure 1 the first lengths of wire 42 extend through the first and second holes 73 and 74 in the outer wall member 49 of only selected winding forms 44. The first lengths of wire 42 therefore have been shown in Figure 1 as extending through securing apertures in winding forms indicated by the reference numerals 76 and 77, respectively, which are the winding forms which support the windings which come directly from a power source which has not been shown. The only other winding form which has been shown with the first lengths of wire 42 extending through holes 73 and 74 is a winding form 78 which is located directly across the stator from the forms 76 and 77. It should be readily recognized that the winding forms having the securing apertures could vary from one construction to another without departing from the spirit and scope of the invention.

The second lengths of wire 43 which are located and extend from opposite sides of the starting windings 39 extend in the first and second notches 63 and 64, respectively, of the inner wall member 48 and from there they extend on to other starting windings 39 which are located adjacent thereto. The winding forms 44 of the present invention have also been provided with a supporting rib 79 on the inner wall member 48 which extends from the upper portion 65 thereof, tapering outwardly toward the bottom surface 55 of the inner wall member. This supporting rib 79 terminates in substantially the same plane as the bottom surface of the inner and outer wall members and resides on the wide portion 21 of the first primary teeth 17. The winding forms 44 are provided with a groove 82 on the outer wall member 49 which groove allows access to the bolts 12 while the winding forms 44 are in place on the stator 10.

The assembly of the stator which has been shown in the accompanying drawing is basically as follows. The first primary teeth 17 are insulated by means of the paper or other suitable insulation 84. The winding forms 44 are then placed in the positions in which they are shown in Figure 1. The frictional engagement of the slot insulation 84 with the winding forms holds the forms fairly well in the position in which they are shown. The main windings 38 are next wound by passing the wire through the main winding slots 35 and 36, respectively, and around the narrow portion 20 of each of the primary teeth 17. The first lengths of wire 42 are slipped into the notches 69 and 70, respectively, of the outer wall member 49 and as has been hereinabove indicated, the first lengths of wire 42 are also anchored on the winndig form 78 and also on the winding form 76 and 77, respectively to prevent slack from accumulating in the windings after the main windings have been wound on the stator and also after the dynamoelectric machine has been assembled and is in use. The starting windings 39 are next wound and the second lengths of wire 43 which extend between each of the starting windings at either side portion thereof are placed in the notches 63 and 64, respectively, of the inner wall member 48.

It will therefore be seen that the first and second wall members 48 and 49 contain a portion of each of the main windings 38 and as a result, the necessity of lacing the windings after they are wound has been circumvented. The use of the winding forms enables the stator to be wound with a saving in time and labor and insures that the human error in the lacing operation will be done away with and none of the windings will be missed and they will all be securely held in place. The notches on the outer wall member in which the lengths of wire which extend from adjacent main windings reside, insure that the wires will be firmly supported and that the chance of their physical misuse and possible grounding is almost entirely done away with. The notches on the inner wall member also firmly anchor the lengths of wire which extend between adjacent starting windings.

The holes 73 and 74, respectively, in the outer wall member also provide a convenient means of firmly anchoring a section of wire which makes up a particular number of main windings and the lengths of wire which extend therebetween, to insure that no slack will be allowed to get into these windings and lengths of wire and as a result the possibility of their becoming entangled is practically done away with.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a dynamoelectric machine having poles with coils extending therearound the provision of winding forms, said winding forms each comprising a unitary plastic structure including first and second substantially parallel spaced wall members, said first wall member being of shorter length and greater height than said second wall member, an interconnecting member extending between and connecting said first and second spaced wall members, each of said wall members having notch means extending transverse to the extent thereof to anchor lead wires extending from one winding to another, one of said wall members having a hole extending therethrough for anchoring lead wires to prevent slack therein, and a supporting rib on said first wall member on a side opposite said interconnecting member and extending from the top portion of said first wall member and tapering outwardly toward the bottom portion of said first wall member.

2. In a dynamoelectric machine having poles with windings thereon the provision of winding forms, said winding forms each including first and second substantially parallel spaced wall members, an interconnecting member extending between and connecting said first and second spaced wall members, at least one of said wall members having notch means extending transverse to the extent of said wall members to support lead wires which extend from one winding to another, at least one of said wall members having a hole extending therethrough for anchoring lead wires.

3. In a dynamoelectric machine having a laminated stator with slots forming inwardly extending teeth, inward ends of said teeth forming a rotor bore, bolts securing the stator laminations together, coils extending through selected slots and wound around selected teeth, and lengths of wire uniting said coils; a winding form residing on at least one selected tooth, said winding form including first and second straight parallel wall members, said first and second wall members connected by a transverse member which extends generally radially of said stator, said first wall member resting on said selected tooth closer said bore than said second wall member, said first wall member being of greater height and shorter length than said second wall member, a supporting rib on said first wall member on a side opposite said transverse member and extending from the top of said first wall member and tapering outwardly toward the bottom of said first wall member and engaging said selected tooth, wall means defining an arcuate surface on said second wall member on a side opposite said transverse member which engages a stator bolt to keep said form from outward radial movement, a portion of said coil extending around said transverse member and between said first and second wall members, a notch on each end of each said first and second wall members extending laterally of the extent of said wall members for anchoring said lengths of wire, and apertures extending through said second wall member through which the end portions of said lengths of wire extend to prevent slack therein.

4. In a dynamoelectric machine having a laminated stator having slots forming inwardly extending teeth, inward ends of said teeth forming a rotor bore, means securing the stator laminations together, coils extending through selected slots and wound around selected teeth, and lengths of wire uniting said coils; a winding form residing on at least one selected tooth, said winding form including first and second wall members, said first and second wall members connected by a transverse member which extends generally radially of said stator, said first wall member resting on said selected tooth closer said bore than said second wall member, said first wall member being of greater height and shorter length than said second wall member, a supporting rib on said first wall member on a side opposite said transverse member extending from the top portion of said first wall member and tapering outwardly toward the bottom portion of said first wall member and engaging said selected tooth, wall means defining an arcuate surface on said second wall member on a side opposite said transverse member which engages said means for securing said stator laminations together to keep said form from outward movement, a portion of said coil extending around said transverse member and between said first and second wall members, a notch on each said first and second wall members extending laterally of the extent of said wall members for anchoring said lengths of wire, and apertures extending through said second wall member through which the end portions of said lengths of wire extend to prevent slack therein.

5. In a dynamoelectric machine having windings and teeth which define a rotor bore; the provision of a winding form, said winding form including first and second spaced wall members each having first and second end portions, an interconnecting member extending between and connecting said first and second spaced wall members, said second wall member being located closer to said rotor bore than said first wall member, said second wall member being of a greater height than said first wall member, and a notch in end portions of said first and second wall members for supporting wires from said windings.

6. In a dynamoelectric machine having poles with windings extending therearound; the provision of a winding form, said winding form including first and second spaced wall members each having first and second end portions, an interconnecting member extending between and connecting said first and second spaced wall members, and a notch in each end portion of said first and second wall member for supporting wires from said windings.

References Cited in the file of this patent

UNITED STATES PATENTS

| | | |
|---|---|---|
| 1,803,493 | Volet | May 5, 1931 |
| 2,339,432 | Stahl | Jan. 18, 1944 |
| 2,485,628 | Morrill | Oct. 25, 1949 |
| 2,687,483 | Fry | Aug. 24, 1954 |
| 2,688,103 | Sheldon | Aug. 31, 1954 |
| 2,795,765 | Stroble | June 11, 1957 |